(12) United States Patent
Ogata (10) Patent No.: US 9,188,027 B2
(45) Date of Patent: Nov. 17, 2015

(54) RECOVERY SYSTEM USING FLUID COUPLING ON POWER GENERATING SYSTEM

(75) Inventor: Hiroshi Ogata, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 302 days.

(21) Appl. No.: 13/520,641

(22) PCT Filed: Sep. 28, 2010

(86) PCT No.: PCT/JP2010/067314
§ 371 (c)(1),
(2), (4) Date: Jul. 5, 2012

(87) PCT Pub. No.: WO2011/092895
PCT Pub. Date: Aug. 4, 2011

(65) Prior Publication Data
US 2012/0272650 A1 Nov. 1, 2012

(30) Foreign Application Priority Data
Jan. 28, 2010 (JP) ................. 2010-016208

(51) Int. Cl.
*F01K 23/02* (2006.01)
*F01K 13/00* (2006.01)
(Continued)

(52) U.S. Cl.
CPC ............. *F01K 13/006* (2013.01); *F01K 9/02* (2013.01); *F01K 23/02* (2013.01); *F01K 23/08* (2013.01); *F22B 3/06* (2013.01); *F22D 1/00* (2013.01)

(58) Field of Classification Search
CPC ....... F01K 13/006; F01K 23/06; F01K 23/08; F01K 27/005; F01K 27/02; F01K 3/18; F01K 3/185; F22B 3/02; F22B 3/06; F22D 1/00; F03G 2007/007; F24D 11/025; F24D 2200/16; F24D 2200/30; Y02T 70/5281
USPC ........... 60/645, 651, 653, 655, 664, 670, 671, 60/676, 679–681, 614–618; 122/26; 188/290–296
See application file for complete search history.

(56) References Cited

U.S. PATENT DOCUMENTS 3,722,211 A * 3/1973 Conner et al. .................. 60/531
4,541,246 A * 9/1985 Chang ............................. 60/648
(Continued)

FOREIGN PATENT DOCUMENTS

DE 1 047 209 12/1958
DE 19716299 C1 * 2/1998
(Continued)

OTHER PUBLICATIONS
International Search Report issued Jun. 4, 2012 in International (PCT) Application No. PCT/JP2010/067314.

Primary Examiner — Thomas Denion
Assistant Examiner — Laert Dounis
(74) Attorney, Agent, or Firm — Wenderoth, Lind & Ponack, L.L.P.

(57) ABSTRACT

A power generating system can recover exhaust heat from a working fluid of a fluid coupling and utilize the recovered exhaust heat to generate power. In the power generating system, water is supplied to a boiler by a feed pump to generate steam, a steam turbine is driven by using the generated steam to generate power, the steam discharged from the steam turbine is condensed in a condenser, and then the condensed water is resupplied to the boiler by the feed pump. The power generating system includes a fluid coupling provided between the feed pump and a motor to transmit a torque from the motor to the feed pump by a working fluid, and the condensed water supplied from the condenser is heated by the working fluid discharged from the fluid coupling.

7 Claims, 7 Drawing Sheets

(51) Int. Cl.
*F01K 9/02* (2006.01)
*F01K 23/08* (2006.01)
*F22B 3/06* (2006.01)
*F22D 1/00* (2006.01)

(56) References Cited

U.S. PATENT DOCUMENTS

| | | | |
|---|---|---|---|
| 5,279,262 A * | 1/1994 | Muehleck | 122/26 |
| 7,062,913 B2 * | 6/2006 | Christensen et al. | 60/651 |
| 2009/0217889 A1 * | 9/2009 | Bartosch et al. | 123/41.21 |
| 2010/0326099 A1 * | 12/2010 | Maxwell | 62/115 |

FOREIGN PATENT DOCUMENTS

| | | | | |
|---|---|---|---|---|
| JP | 56-47606 | | 4/1981 | |
| JP | 60139538 A | * | 7/1985 | B60K 25/02 |
| JP | 03-286103 | | 12/1991 | |
| JP | 8-135907 | | 5/1996 | |
| JP | 08135907 A | * | 5/1996 | F22D 5/32 |
| JP | 2004-287676 | | 10/2004 | |
| JP | 2009-287676 | | 12/2009 | |

* cited by examiner

RECOVERY SYSTEM USING FLUID COUPLING ON POWER GENERATING SYSTEM

BACKGROUND OF THE INVENTION

1. Technical Field

The present invention relates to a power generating system, and more particularly to a power generating system which can recover exhaust heat from a working fluid of a fluid coupling and utilize the recovered exhaust heat to generate power.

2. Background Art

There has been known a fluid coupling in which an impeller is coupled to a drive shaft (input shaft) and a runner is coupled to a driven shaft (output shaft), and power is transmitted from a driving source to a driven source through a working oil which fills a casing. The fluid coupling is employed to drive a feed pump or a blower at a variable speed in a thermal power plant, a nuclear power plant or the like, and to drive a pump or a blower at a variable speed in an ironworks or the like. When the pump or the blower is driven by the fluid coupling at a variable speed, a rotational speed of a load side, i.e. a driven machine, can be varied continuously from a minimum rotational speed to a maximum rotational speed by using a scoop tube. However, slip which is a rotational speed difference between a prime mover and a driven machine causes a slip loss.

When the rotational speed of the driven machine is low, the slip loss becomes large. Therefore, in some cases, a power loss of the fluid coupling reaches 14.8% of rated power of the driven machine at the maximum, resulting in a large energy loss.

A temperature of the working oil as a working fluid rises due to the slip loss of the fluid coupling. Therefore, the working oil discharged from the fluid coupling has been returned to the fluid coupling after being cooled down by an oil cooler. That is, heat caused by the slip loss in the fluid coupling is released outside through the oil cooler.

CITATION LIST

Patent Literature

PTL 1: Japanese Patent Laid-Open Publication No. 8-135907

SUMMARY OF THE INVENTION

As described above, a temperature of the working oil as a working fluid rises due to the slip loss in the fluid coupling. However, the fluid coupling has an oil cooler as an auxiliary machine so that the heated working oil discharged from the fluid coupling is cooled by the oil cooler and then returned to the fluid coupling. Therefore, heat of the slip loss generated in the fluid coupling is released outside without being recovered.

Inventors of the present invention have studied, from the viewpoint of energy saving, an entire system including a fluid coupling and a driven machine driven by the fluid coupling, and found the subject that heat of the slip loss in the fluid coupling which has been released outside should be recovered to promote energy saving in the entire system.

The present invention has been made in view of the above circumstances. It is therefore an object of the present invention to provide a power generating system which can recover heat of a slip loss in a fluid coupling by recovering exhaust heat from a working fluid discharged from the fluid coupling and utilize the recovered exhaust heat (heat of the slip loss) to generate power.

In order to achieve the above object, according to a first aspect of the present invention, there is provided a power generating system in which water is supplied to a steam generator by a feed pump to generate steam, a steam turbine is driven by using the generated steam to generate power, the steam discharged from the steam turbine is condensed in a condenser, and then the condensed water is resupplied to the steam generator by the feed pump; the power generating system comprising: a fluid coupling provided between the feed pump and a driving machine for driving the feed pump to transmit a torque from the driving machine to the feed pump by a working fluid which fills an impeller chamber; wherein the condensed water supplied from the condenser is heated by the working fluid discharged from the fluid coupling.

According to the first aspect of the present invention, water is supplied to a steam generator by a feed pump driven through a fluid coupling by a driving machine to generate high-temperature steam in the steam generator, and a steam turbine is driven by using the high-temperature steam to generate power. The steam discharged from the steam turbine is supplied to a condenser where the steam is condensed, and the condensed water of the condenser is heated by a working fluid discharged from the fluid coupling. The heated condensed water is resupplied to the steam generator. In this manner, heat of a slip loss in the fluid coupling can be recovered by means of heating the condensed water by the working fluid discharged from the fluid coupling, and thus thermal efficiency of the entire steam turbine power generating system can be enhanced to improve power generation efficiency.

According to one aspect of the present invention, the power generating system further comprises a heat exchanger for performing heat exchange between the working fluid discharged from the fluid coupling and the condensed water supplied from the condenser to heat the condensed water.

According to one aspect of the present invention, the power generating system further comprises a first heat exchanger for performing heat exchange between the working fluid discharged from the fluid coupling and a heat exchange medium; and a second heat exchanger for performing heat exchange between the heat exchange medium and the condensed water supplied from the condenser; wherein the heat exchange medium is heated by the heat exchange between the working fluid and the heat exchange medium in the first heat exchanger, and the condensed water is heated by the heat exchange between the heat exchange medium heated in the first heat exchanger and the condensed water in the second heat exchanger.

According to this aspect of the present invention, because a circulation path of the working fluid and a circulation path of the condensed water are completely separated from each other, a risk of contamination of the condensed water by the working fluid can be reduced.

According to one aspect of the present invention, the power generating system further comprises a heat pump cycle which comprises an evaporator, a compressor, a refrigerant condenser and an expansion valve; wherein the working fluid discharged from the fluid coupling is supplied to the evaporator to heat a refrigerant of said heat pump cycle, and the condensed water is supplied from the condenser to the refrigerant condenser to heat the condensed water.

According to this aspect of the present invention, a refrigerant takes heat from the working fluid of the fluid coupling and evaporates in an evaporator to turn to a low-temperature and low-pressure gas, and then the low-temperature and low-pressure gas is compressed into a high-temperature and high-pressure gas by a compressor. Then, the high-temperature and high-pressure refrigerant gas releases heat by heat exchange with the condensed water in a refrigerant condenser to heat the condensed water. At this time, the refrigerant is condensed and liquefied under high pressure. The resulting high-pressure liquid expands through an expansion valve (pressure reducing valve) and is depressurized to return to its original low-temperature and low-pressure liquid. Then, the low-temperature and low-pressure liquid is resupplied to the evaporator. In this manner, a heat pump cycle which comprises a heat source of the working fluid discharged from the fluid coupling and a cooling source of the condensed water is constructed to heat the condensed water by the working fluid, thereby enabling heat of a slip loss of the fluid coupling to be recovered. Therefore, thermal efficiency of the entire steam turbine power generating system can be enhanced to improve power generation efficiency.

According to one aspect of the present invention, the power generating system further comprises a heat pump cycle which comprises an evaporator, a compressor, a refrigerant condenser and an expansion valve; and a heat exchanger for performing heat exchange between the condensed water supplied from the condenser and a heat exchange medium; wherein the working fluid discharged from the fluid coupling is supplied to the evaporator to heat a refrigerant of said heat pump cycle, and the heat exchange medium is supplied to the refrigerant condenser to heat the heat exchange medium; and the condensed water is heated in the heat exchanger by heat exchange between the heat exchange medium heated in the refrigerant condenser and the condensed water supplied from the condenser.

According to this aspect of the present invention, a refrigerant takes heat from the working fluid and evaporates in an evaporator to turn to a low-temperature and low-pressure gas, and then the low-temperature and low-pressure gas is compressed into a high-temperature and high-pressure gas by a compressor. Then, the high-temperature and high-pressure refrigerant gas releases heat by heat exchange with a heat exchange medium supplied from a heat exchanger in a refrigerant condenser to heat the heat exchange medium. At this time, the refrigerant gas is condensed and liquefied under high pressure. The resulting high-pressure liquid expands through an expansion valve (pressure reducing valve) and is depressurized to return to its original low-temperature and low-pressure liquid. Then, the low-temperature and low-pressure liquid is resupplied to the evaporator. The heat exchange medium heated in the refrigerant condenser returns to the heat exchanger where heat exchange is performed between the heat exchange medium and the condensed water supplied from the condenser to heat the condensed water. In this manner, a heat pump cycle which comprises a heat source of the working fluid discharged from the fluid coupling and a cooling source of the condensed water is constructed to heat the condensed water by the working fluid, thereby enabling heat of a slip loss of the fluid coupling to be recovered. Therefore, thermal efficiency of the entire steam turbine power generating system can be enhanced to improve power generation efficiency. Further, because a circulation path of the refrigerant in the heat pump cycle and a circulation path of the condensed water are completely separated from each other, a risk of contamination of the condensed water by the refrigerant can be reduced.

According to a second aspect of the present invention, there is provided a power generating system in which water is supplied to a steam generator by a feed pump to generate steam, a steam turbine is driven by using the generated steam to generate power, the steam discharged from the steam turbine is condensed in a condenser, and then the condensed water is resupplied to the steam generator by the feed pump; the power generating system comprising: a fluid coupling provided between the feed pump and a driving machine for driving the feed pump to transmit a torque from the driving machine to the feed pump by a working fluid which fills an impeller chamber; and a heat pump cycle which comprises an evaporator, a compressor, a refrigerant condenser and an expansion valve; wherein the working fluid discharged from the fluid coupling is supplied to the evaporator to heat a refrigerant of the heat pump cycle, part of the steam discharged from the steam turbine is supplied to the refrigerant condenser, and the steam discharged from the steam turbine is heated by the refrigerant which has been heated by the working fluid discharged from the fluid coupling.

According to the second aspect of the present invention, water is supplied to a steam generator by a feed pump driven through a fluid coupling by a driving machine to generate high-temperature steam in the steam generator, and a steam turbine is driven by using the high-temperature steam to generate power. The steam discharged from the steam turbine is supplied to a condenser where the steam is condensed. The working oil whose temperature has been raised is supplied to the evaporator in the heat pump cycle from the fluid coupling and part of the low-pressure steam discharged from the steam turbine is supplied to the condenser. A refrigerant takes heat from the working oil of the fluid coupling and evaporates in the evaporator to turn to a low-temperature and low-pressure gas, and then the low-temperature and low-pressure gas is compressed into a high-temperature and high-pressure gas by the compressor and supplied to the condenser. On the other hand, part of the low-pressure steam discharged from the steam turbine is compressed by a compressor and supplied to a cooling side (a side to be heated) of the condenser. The high-temperature and high-pressure refrigerant gas releases heat by heat exchange with the compressed low-pressure steam in the condenser to heat the low-pressure steam, i.e., superheat the low-pressure steam. At this time, the refrigerant is condensed and liquefied under high pressure. The resulting high-pressure liquid expands through the expansion valve (pressure reducing valve) and is depressurized to return to its original low-temperature and low-pressure liquid. Then, the low-temperature and low-pressure liquid is resupplied to the evaporator. On the other hand, the steam superheated in the condenser is introduced into a middle stage of the steam turbine and contributes to driving of the steam turbine.

According to one aspect of the present invention, the steam which has been discharged from the steam turbine and heated in the condenser is introduced into a middle stage of the steam turbine.

According to a third aspect of the present invention, there is provided a power generating system comprising: a fluid coupling provided between a driving machine and a driven machine for transmitting a torque from the driving machine to the driven machine by a working fluid which fills an impeller chamber; wherein the working fluid discharged from the fluid coupling is supplied to a vapor generator, a refrigerant in the vapor generator is heated by the working fluid and is evaporated, a turbine is driven by using the generated refrigerant vapor to generate power, the refrigerant vapor discharged from the turbine is introduced into a refrigerant condenser where the refrigerant vapor is cooled by a cooling medium and condensed, and the condensed refrigerant liquid is resupplied to the vapor generator.

According to the third aspect of the present invention, a working fluid discharged from a fluid coupling is supplied to a vapor generator where a refrigerant is heated by heat exchange with the working fluid, and part of the refrigerant evaporates to turn to high-temperature refrigerant vapor. Then, the refrigerant vapor is introduced into a turbine and drives the turbine to generate power. The refrigerant vapor discharged from the turbine is introduced into a refrigerant condenser and cooled by a cooling medium, thus being condensed and liquefied. The liquefied refrigerant is resupplied to the vapor generator. In this manner, the refrigerant is evaporated by utilizing exhaust heat of the working fluid of the fluid coupling, and the turbine is driven by using the refrigerant vapor to generate power, thereby enabling heat of a slip loss of the fluid coupling to be recovered. Therefore, thermal efficiency of the entire system for pumping a fluid such as a liquid or a gas by driving the driven machine using the fluid coupling can be enhanced to improve energy saving.

According to one aspect of the present invention, the refrigerant comprises dichlorotrifluoroethane (HCFC123) or trifluoroethanol ($CF_3CH_2OH$).

According to the first aspect of the present invention, in the power generating system in which water is supplied to a steam generator by a feed pump to generate steam, a steam turbine is driven by using the generated steam to generate power, the steam discharged from the steam turbine is condensed in a condenser, and then the condensed water is resupplied to the steam generator by the feed pump, heat of a slip loss in the fluid coupling can be recovered by means of heating the condensed water by the working fluid discharged from the fluid coupling for driving the feed pump. Therefore, thermal efficiency of the entire power generating system can be enhanced to improve power generation efficiency. In some cases, a power loss of the fluid coupling reaches 14.8% of rated power of the feed pump at the maximum. However, according to the present invention, most of the power loss can be recovered, and hence power generation efficiency of the entire power generating system can be enhanced tremendously.

According to the second aspect of the present invention, in the power generating system in which water is supplied to a steam generator by a feed pump to generate steam, a steam turbine is driven by using the generated steam to generate power, the steam discharged from the steam turbine is condensed in a condenser, and then the condensed water is resupplied to the steam generator by the feed pump, a heat pump cycle which comprises a heat source of a working oil discharged from the fluid coupling for driving the feed pump and a cooling source of the low-pressure steam discharged from the steam turbine is constructed to heat the low-pressure steam discharged from the steam turbine by the working oil as a heat source, thereby recovering heat of a slip loss of the fluid coupling. Therefore, thermal efficiency of the entire steam turbine power generating system can be enhanced to improve power generation efficiency.

According to the third aspect of the present invention, the refrigerant is evaporated by utilizing exhaust heat of the working fluid of the fluid coupling and the turbine is driven by using the refrigerant vapor to generate power, thereby enabling heat of a slip loss in the fluid coupling to be recovered. Therefore, thermal efficiency of the entire system for pumping a fluid such as a liquid or a gas by driving the driven machine using the fluid coupling can be enhanced to improve energy saving. In some cases, a power loss of the fluid coupling reaches 14.8% of rated power of the driven machine at the maximum. However, according to the present invention, most of the power loss can be recovered as power in the exhaust heat power generating system, and thus thermal efficiency of the entire system can be enhanced remarkably using the fluid coupling.

DETAILED DESCRIPTION OF THE EMBODIMENTS

A power generating system according to embodiments of the present invention will be described in detail with reference to FIGS. 1 through 7. The same or corresponding structural members or elements are denoted by the same reference numerals in FIGS. 1 through 7 and will not be described repetitively.

Figure 1:
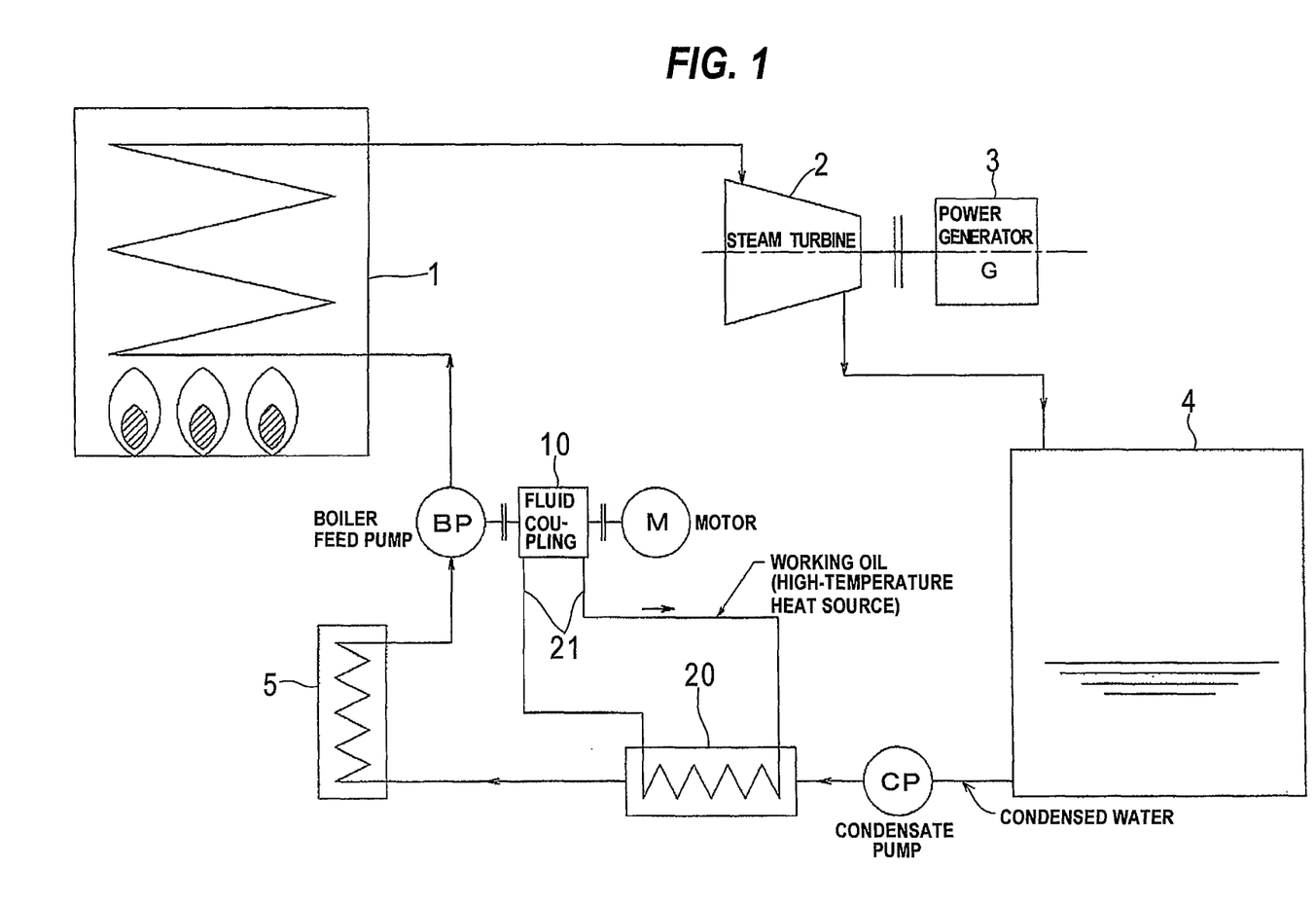
FIG. 1 is a schematic view showing a steam turbine power generating system according to a first embodiment of a power generating system of the present invention.

FIG. 1 schematically shows a steam turbine power generating system according to a first embodiment of a power generating system of the present invention. In FIG. 1, a steam turbine power generating system provided in a thermal power plant is shown, and a boiler is used as a steam generator.

As shown in FIG. 1, in a steam turbine power generating system, water is supplied by a boiler feed pump BP to a boiler where high-temperature steam (high-pressure steam) is generated, and a steam turbine 2 is driven by using the high-temperature steam and power is generated by a power generator 3 coupled to the steam turbine 2. Then, the steam (low-pressure steam) discharged from the steam turbine 2 is supplied to a condenser 4 where the steam is condensed, and the condensed water in the condenser 4 is pumped up to a feed-water heater 5 by a condensate pump CP. Then, the condensed water heated in the feed-water heater 5 is resupplied to the boiler 1 by the boiler feed pump BP. The steam turbine 2 has multistage blades and the blades at each stage are configured to cope with variable steam pressure optimally from the high-pressure steam immediately after introduction to the steam turbine 2 to the low-pressure steam immediately before discharge from the steam turbine 2.

As shown in FIG. 1, in the steam turbine power generating system of this embodiment, a fluid coupling 10 is provided between the boiler feed pump BP and a motor M for driving the boiler feed pump BP so that a torque of the motor M is transmitted to the boiler feed pump BP through a working oil (working fluid) of the fluid coupling 10.

Figure 2:
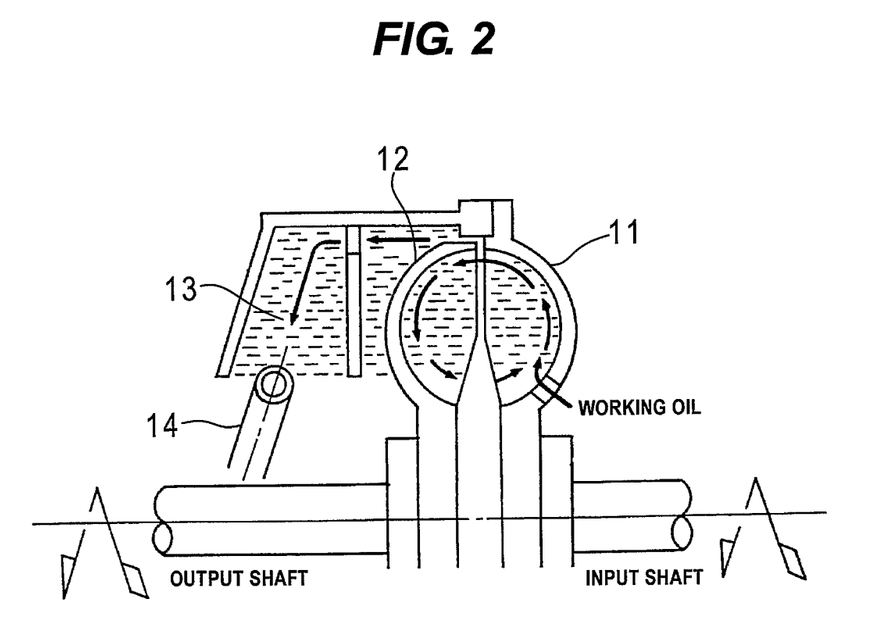
FIG. 2 is a schematic view showing a schematic structure of a fluid coupling.

FIG. 2 is a schematic view showing a schematic structure of the fluid coupling 10. As shown in FIG. 2, the working oil which has flowed into an impeller chamber is transferred to an outer circumferential side due to a centrifugal force imparted by the impeller 11, and then flows into a runner 12 to rotate the runner 12. A cylindrical oil layer is formed due to the centrifugal force in a scoop tube chamber 13 and the working oil is scooped through a forward end of the scoop tube 14. A rotational speed ratio of the impeller 11 to the runner 12 can be varied by changing the position of the scoop tube 14 arbitrarily, thereby controlling the rotational speed of the driven machine continuously. In the fluid coupling 10, slip which is a rotational speed difference between the impeller 11 and the runner 12 becomes a slip loss which raises a temperature of the working oil.

Therefore, according to the embodiment shown in FIG. 1, a heat exchanger 20 is provided to heat the condensed water by heat exchange between the working oil of the fluid coupling 10 and the condensed water supplied from the condenser 4. Specifically, the working oil discharged from the fluid coupling 10 through the scoop tube 14 is introduced via a working oil path 21 into the heat exchanger 20 and the condensed water in the condenser 4 is concurrently introduced into the heat exchanger 20 by the condensate pump CP. Then, the heat exchange is performed between the working oil and the condensed water to heat the condensed water in the heat exchanger 20. The working oil has a temperature of about 70° C. to 90° C. at an inlet side of the heat exchanger 20. The working oil is cooled down to a temperature of about 50° C. by heat exchange in the heat exchanger 20, and is then returned to the fluid coupling 10. On the other hand, the condensed water has a temperature of about 30° C. to 35° C. at an inlet side of the heat exchanger 20. The condensed water is heated by heat exchange in the heat exchanger 20, and is then supplied to the feed-water heater 5. Further, the condensed water which has been heated in the feed-water heater 5 is resupplied to the boiler 1 by the boiler feed pump BP, as mentioned above.

According to the steam turbine power generating system of this embodiment, heat of a slip loss of the fluid coupling 10 can be recovered by heating the condensed water by the working oil discharged from the fluid coupling 10, and thus thermal efficiency of the entire steam turbine power generating system can be enhanced to improve power generation efficiency. In some cases, a power loss of the fluid coupling reaches 14.8% of rated power of the boiler feed pump BP at the maximum. However, according to the present invention, most of the power loss can be recovered in the heat exchanger 20, and hence power generation efficiency of the entire steam turbine power generating system can be remarkably enhanced.

Figure 3:
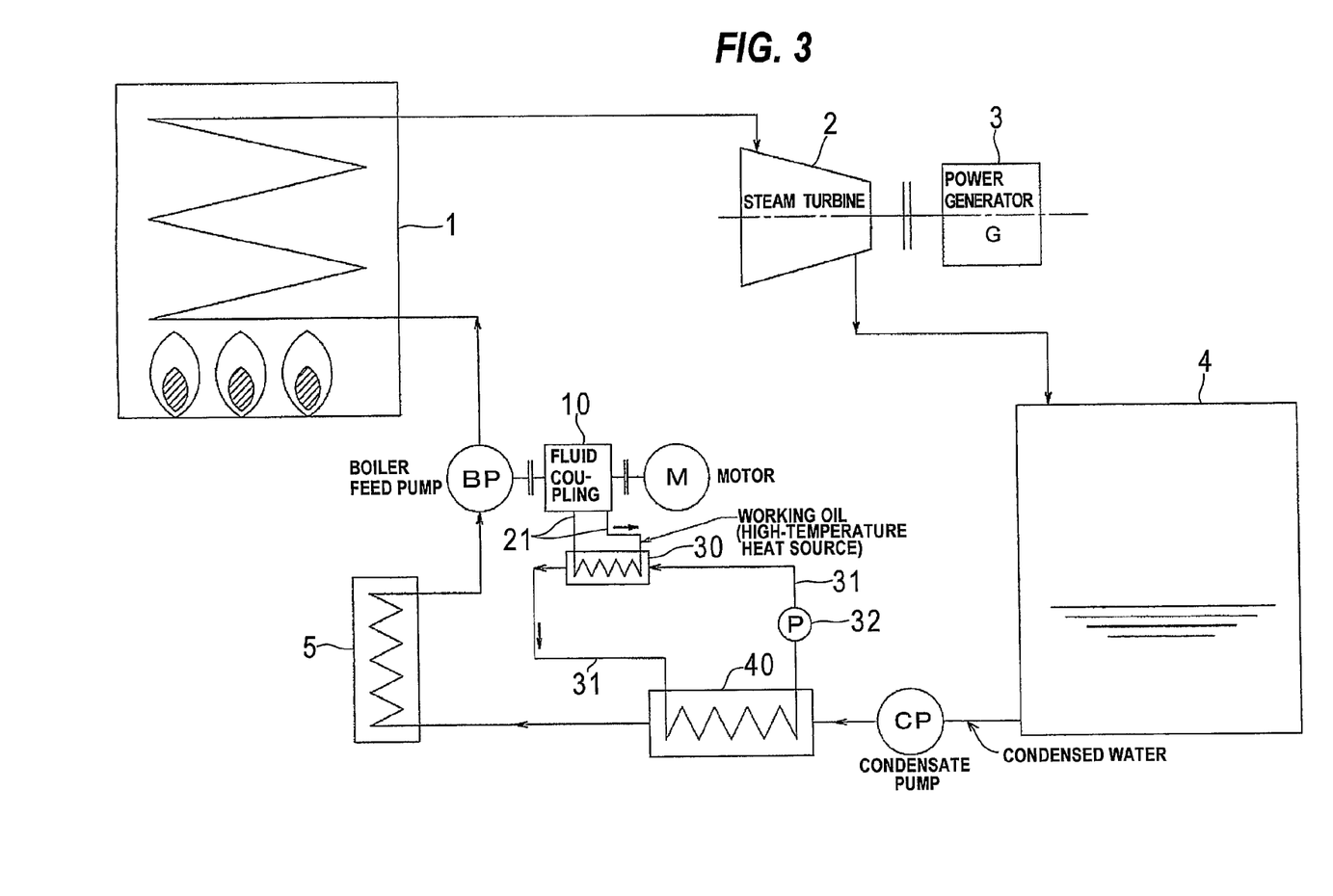
FIG. 3 is a schematic view showing a steam turbine power generating system according to a second embodiment of the present invention.

FIG. 3 is a schematic view showing a steam turbine power generating system according to a second embodiment of the present invention. In the embodiment shown in FIG. 3, there are provided a first heat exchanger 30 which performs heat exchange between a working oil of a fluid coupling 10 and a heat exchange medium, and a second heat exchanger 40 which performs heat exchange between the above heat exchange medium and condensed water supplied from a condenser 4. Clean water is used as a heat exchange medium. Specifically, the working oil discharged from the fluid coupling 10 through the scoop tube 14 is introduced into the first heat exchanger 30 through a working oil path 21 and the heat exchange medium is introduced into the first heat exchanger 30 through a heat exchange medium path 31. Then, the heat exchange medium is heated by heat exchange between the working oil and the heat exchange medium. A circulating pump 32 is provided in the heat exchange medium path 31. The heat exchange medium which has been heated in the first heat exchanger 30 is introduced into the second heat exchanger 40 through the heat exchange medium path 31 and the condensed water in the condenser 4 is introduced into the second heat exchanger 40 by a condensate pump CP. Then, the condensed water is heated by heat exchange between the heat exchange medium and the condensed water.

The working oil discharged from the fluid coupling 10 has a temperature of about 70° C. to 90° C. at an inlet side of the first heat exchanger 30. The working oil is cooled down to a temperature of about 50° C. by heat exchange in the first heat exchanger 30, and is then returned to the fluid coupling 10. On the other hand, the heat exchange medium is heated to a temperature close to the temperature of the working oil by heat exchange in the first heat exchanger 30, and is then supplied to the second heat exchanger 40. Further, the condensed water has a temperature of about 30° C. to 35° C. at an inlet side of the second heat exchanger 40. The condensed water is heated by heat exchange in the second heat exchanger 40, and is then supplied to the feed-water heater 5. Then, the condensed water which has been heated in the feed-water heater 5 is resupplied to the boiler 1 by the boiler feed pump BP, in the same manner as the embodiment shown in FIG. 1.

According to a steam turbine power generating system of this embodiment, heat of a slip loss of the fluid coupling 10 can be recovered by heating the condensed water by the working oil discharged from the fluid coupling 10, and thus thermal efficiency of the entire steam turbine power generating system can be enhanced to improve power generation efficiency. In some cases, a power loss of the fluid coupling reaches 14.8% of rated power of the boiler feed pump BP at the maximum. However, according to this embodiment, most of the power loss can be recovered in the two heat exchangers 30 and 40, and hence power generation efficiency of the entire steam turbine power generating system can be remarkably enhanced.

In the embodiment shown in FIG. 3, because a circulation path of the working oil and a circulation path of the condensed water are completely separated from each other, a risk of contamination of the condensed water by the working oil can be reduced. Even if the heat exchange medium path 31 is broken or damaged, the condensed water will not be contaminated because water which is as clean as the condensed water is used as a heat exchange medium which flows in the heat exchange medium path 31.

Figure 4:
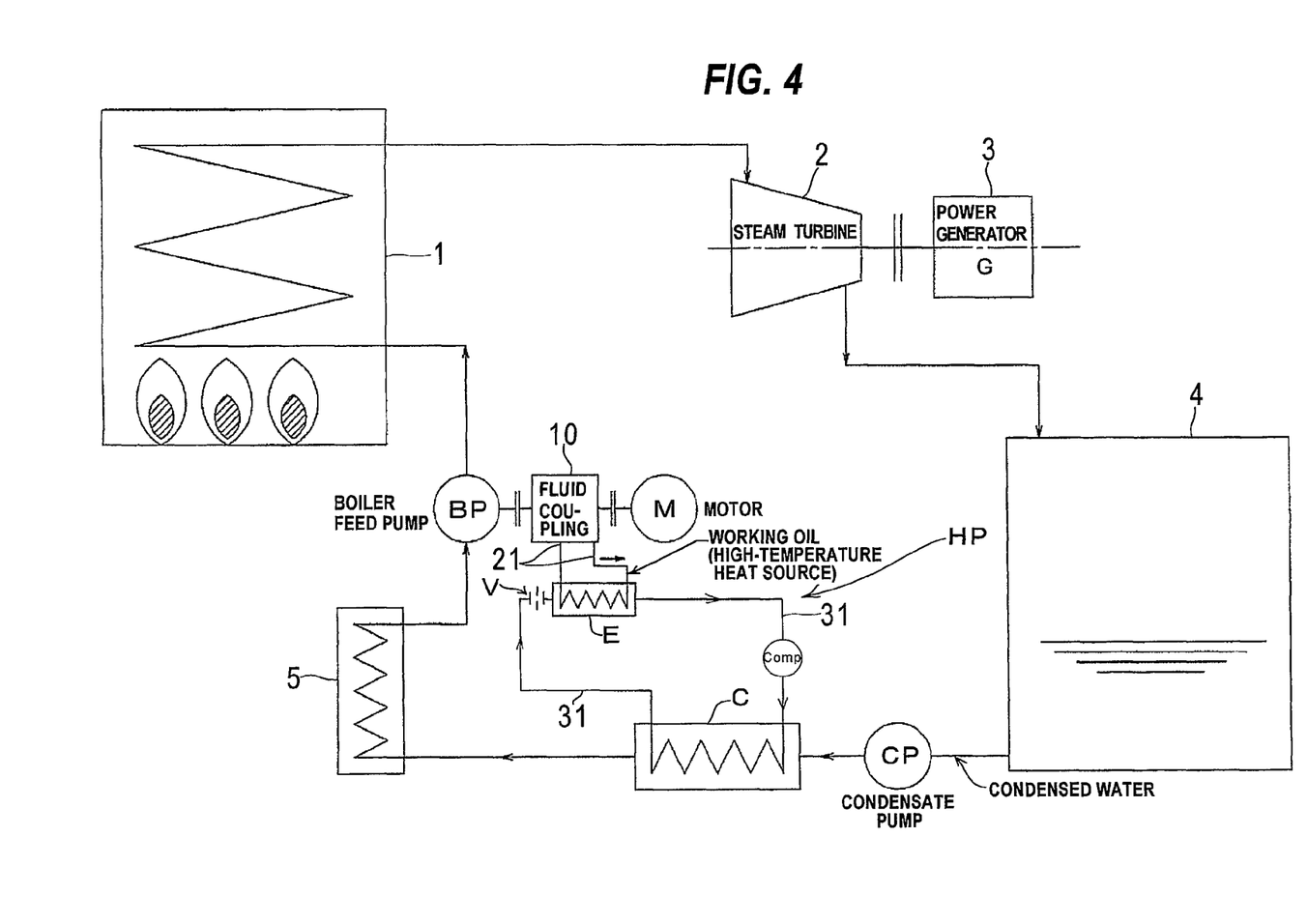
FIG. 4 is a schematic view showing a steam turbine power generating system according to a third embodiment of the present invention.

FIG. 4 is a schematic view showing a steam turbine power generating system according to a third embodiment of the present invention. In the embodiment shown in FIG. 4, a heat pump cycle which comprises a heat source of a working oil of a fluid coupling 10 and a cooling source of condensed water is constructed to heat the condensed water by the working oil. Specifically, the heat pump cycle HP comprises an evaporator E, a compressor Comp, a condenser C serving as a refrigerant condenser, and an expansion valve (pressure reducing valve) V. In the heat pump cycle HP, the working oil whose temperature has been raised is supplied to the evaporator E from the fluid coupling 10 and the condensed water of the condenser 4 is supplied to the condenser C. Alternative for chlorofluorocarbon or the like is used as a refrigerant in the heat pump cycle HP.

In the steam turbine power generating system having the heat pump cycle HP shown in FIG. 4, a refrigerant takes heat from the working oil of the fluid coupling 10 and evaporates in the evaporator E to turn to a low-temperature and low-pressure gas, and then the low-temperature and low-pressure gas is compressed into a high-temperature and high-pressure gas by a compressor Comp. Then, the high-temperature and high-pressure refrigerant gas releases heat by heat exchange with the condensed water in the condenser C to heat the condensed water. At this time, the refrigerant is condensed and liquefied under high pressure. The resulting high-pressure liquid expands through the expansion valve (pressure reducing valve) V and is depressurized to return to its original low-temperature and low-pressure liquid. Then, the low-temperature and low-pressure liquid is resupplied to the evaporator E.

The working oil discharged from the fluid coupling 10 has a temperature of about 70° C. to 90° C. at an inlet side of the evaporator E. The working oil is cooled down to a temperature of about 50° C. by removal of heat in the evaporator E, and is then returned to the fluid coupling 10. On the other hand, the condensed water has a temperature of about 30° C. to 35° C. at an inlet side of the condenser C. The condensed water is heated by heat exchange in the condenser C, and is then supplied to the feed-water heater 5. Further, the condensed water which has been heated in the feed-water heater 5 is resupplied to the boiler 1 by the boiler feed pump BP, in the same manner as the embodiment shown in FIG. 1.

According to the steam turbine power generating system of this embodiment, a heat pump cycle HP which comprises a heat source of a working oil discharged from a fluid coupling 10 and a cooling source of condensed water is constructed to heat the condensed water by the working oil, and thus heat of a slip loss of the fluid coupling 10 can be recovered. Therefore, thermal efficiency of the entire steam turbine power generating system can be enhanced to improve power generation efficiency. In some cases, a power loss of the fluid coupling reaches 14.8% of rated power of the boiler feed pump BP at the maximum. However, according to the present invention, most of the power loss can be recovered by utilizing the heat pump cycle HP, and thus power generation efficiency of the entire steam turbine power generating system can be remarkably enhanced.

Figure 5:
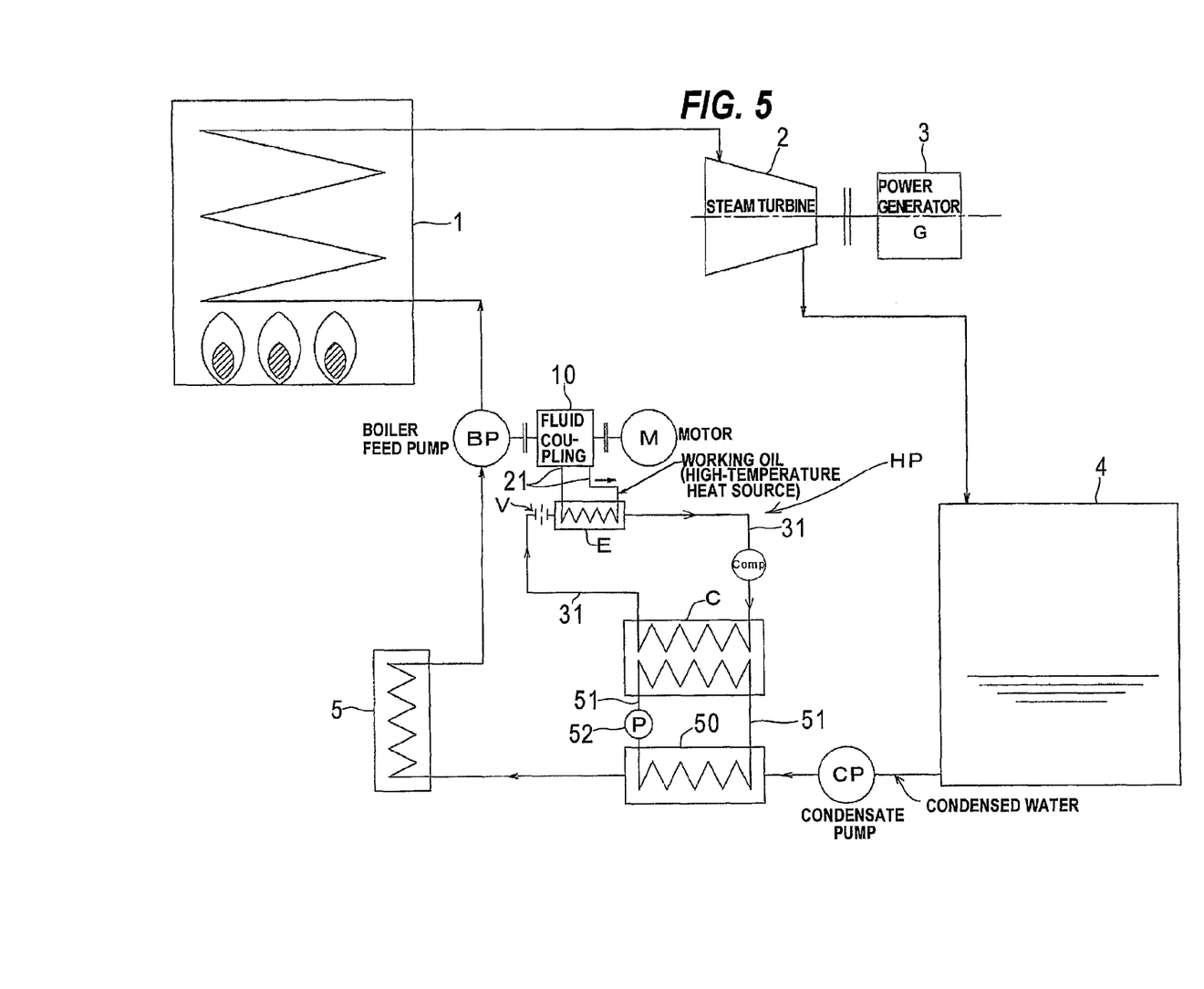
FIG. 5 is a schematic view showing a modified example of the steam turbine power generating system shown in FIG. 4.

FIG. 5 is a schematic view showing a modified example of a steam turbine power generating system shown in FIG. 4. In the embodiment shown in FIG. 4, the condensed water is directly heated in the condenser C in the heat pump cycle HP. However, in the embodiment shown in FIG. 5, a heat exchanger 50 is provided to perform heat exchange between condensed water supplied from a condenser 4 and a heat exchange medium, and the heat exchange medium supplied from the heat exchanger 50 is heated in a condenser C serving as a refrigerant condenser in a heat pump cycle HP. The heat exchange medium circulates between the condenser C and the heat exchanger 50 by a heat exchange medium path 51 and a circulating pump 52 provided in the heat exchange medium path 51. Clean water is used as a heat exchange medium. Specifically, a refrigerant takes heat from the working oil and evaporates in the evaporator E to turn to a low-temperature and low-pressure gas, and then the low-temperature and low-pressure gas is compressed into a high-temperature and high-pressure gas by a compressor Comp. Then, the high-temperature and high-pressure refrigerant gas releases heat by heat exchange with the heat exchange medium supplied from the heat exchanger 50 through the heat exchange medium path 51 in the condenser C to heat the heat exchange medium. At this time, the refrigerant is condensed and liquefied under high pressure. The resulting high-pressure liquid expands through the expansion valve (pressure reducing valve) V and is depressurized to return to its original low-temperature and low-pressure liquid. Then, the low-temperature and low-pressure liquid is resupplied to the evaporator E. The heat exchange medium which has been heated in the condenser C returns to the heat exchanger 50 where the heat exchange medium performs heat exchange with the condensed water supplied from the condenser 4 to heat the condensed water.

In the embodiment shown in FIG. 5, because a circulation path of the refrigerant in the heat pump cycle HP and a circulation path of the condensed water are completely separated from each other, a risk of contamination of the condensed water by the refrigerant can be reduced. Even if the heat exchange medium path 51 is broken or damaged, the condensed water will not be contaminated because water which is as clean as the condensed water is used as a heat exchange medium which flows in the heat exchange medium path 51.

The working oil discharged from the fluid coupling 10 has a temperature of about 70° C. to 90° C. at an inlet side of the evaporator E. The working oil is cooled down to a temperature of about 50° C. by removal of heat in the evaporator E. On the other hand, the condensed water has a temperature of about 30° C. to 35° C. at an inlet side of the heat exchanger 50. The condensed water is heated by heat exchange in the heat exchanger 50, and is then supplied to the feed-water heater 5. Further, the condensed water which has been heated in the feed-water heater 5 is resupplied to the boiler 1 by the boiler feed pump BP, in the same manner as the embodiment shown in FIG. 1.

According to the steam turbine power generating system of this embodiment, a heat pump cycle HP which comprises a heat source of a working oil discharged from a fluid coupling 10 and a cooling source of condensed water is constructed to heat the condensed water by the working oil, and thus heat of a slip loss of the fluid coupling 10 can be recovered. Therefore, thermal efficiency of the entire steam turbine power generating system can be enhanced to improve power generation efficiency.

Figure 6:
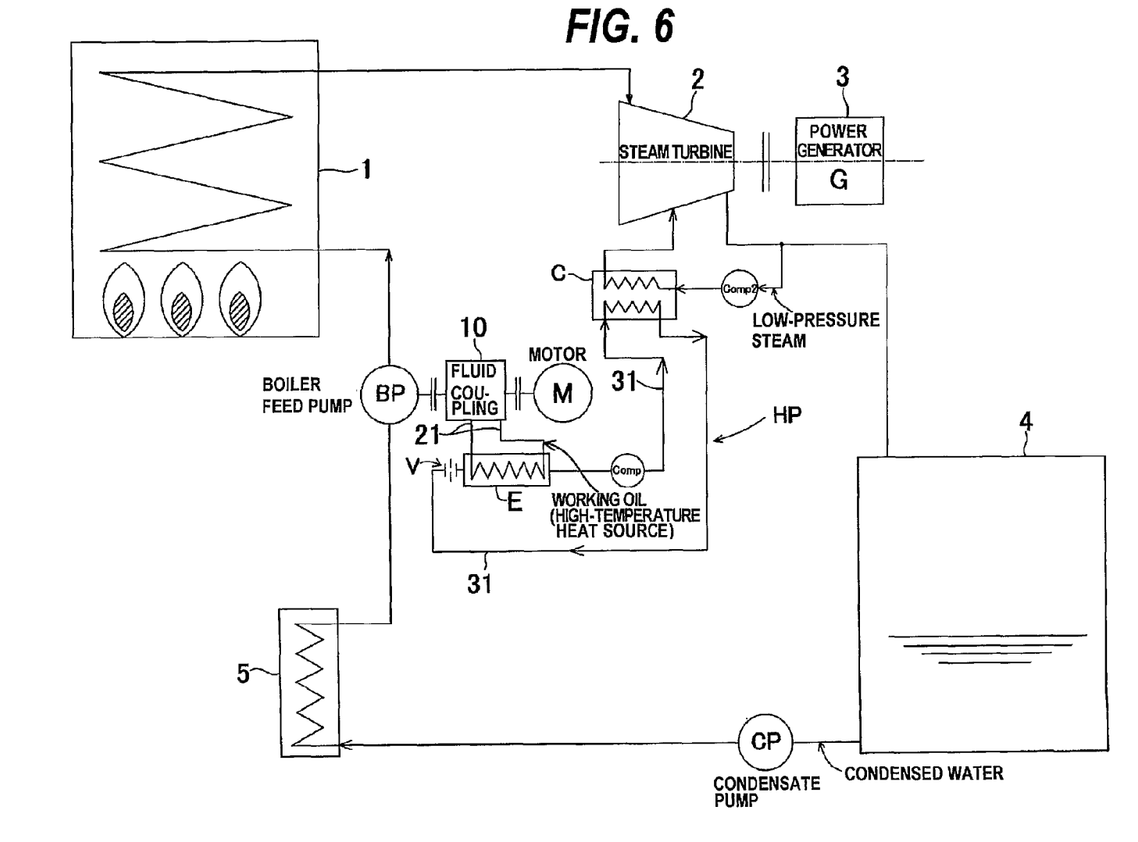
FIG. 6 is a schematic view showing another example of the power generating system according to the present invention.

FIG. 6 is a schematic view showing another embodiment of a power generating system according to the present invention. While the steam turbine power generating system shown in FIGS. 1 through 5 is configured to recover heat of a slip loss of the fluid coupling 10 by heating the condensed water as a heat source of a working oil discharged from the fluid coupling 10, the power generating system according to the embodiment shown in FIG. 6 is different in that heat of a slip loss of the fluid coupling 10 is recovered by heating low-pressure steam discharged from the steam turbine 2 as a heat source of a working oil discharged from the fluid coupling 10 and by introducing the heated low-pressure steam into a low-pressure stage of the steam turbine 2. Further, in the embodiment shown in FIG. 6, in order to obtain high temperature which is enough to heat the low-pressure steam, a heat pump cycle is used in the same manner as the embodiment shown in FIG. 4, and the heat pump cycle which comprises a heat source of a working oil discharged from the fluid coupling 10 and a cooling source of the low-pressure steam discharged from the steam turbine is constructed. Specifically, the heat pump cycle HP comprises an evaporator E, a compressor Comp, a condenser C, and an expansion valve (pressure reducing valve) V. In the heat pump cycle HP, the working oil whose temperature has been raised is supplied to the evaporator E from the fluid coupling 10 and part of the low-pressure steam discharged from the steam turbine 2 is supplied to the condenser C. Alternative for chlorofluorocarbon or the like is used as a refrigerant in the heat pump cycle HP.

In the steam turbine power generating system having the heat pump cycle HP shown in FIG. 6, a refrigerant takes heat from the working oil of the fluid coupling 10 and evaporates in the evaporator E to turn to a low-temperature and low-pressure gas, and then the low-temperature and low-pressure gas is compressed into a high-temperature and high-pressure gas by the compressor Comp and supplied to the condenser C. On the other hand, part of the low-pressure steam discharged from the steam turbine 2 is compressed by a compressor Comp2 and supplied to a cooling side (a side to be heated) of the condenser C. The high-temperature and high-pressure refrigerant gas releases heat by heat exchange with the compressed low-pressure steam in the condenser C to heat the low-pressure steam, i.e., superheat the low-pressure steam. At this time, the refrigerant is condensed and liquefied under high pressure. The resulting high-pressure liquid expands through the expansion valve (pressure reducing valve) V and is depressurized to return to its original low-temperature and low-pressure liquid. Then, the low-temperature and low-pressure liquid is resupplied to the evaporator E. On the other hand, the steam superheated in the condenser C is introduced into a middle stage of the steam turbine 2 and contributes to driving of the steam turbine 2.

The working oil discharged from the fluid coupling 10 has a temperature of about 70° C. to 90° C. at an inlet side of the evaporator E. The working oil is cooled down to a temperature of about 50° C. by removal of heat in the evaporator E, and is then returned to the fluid coupling 10. On the other hand, the low-pressure steam is superheated by heat exchange in the condenser C, and is then supplied to the middle stage of the steam turbine 2. The low-pressure steam whose temperature has decreased by driving the steam turbine 2 is partly compressed by the compressor Comp2 again and supplied to the condenser C, and the rest of the low-pressure steam is returned to the condenser 4 where the steam is condensed.

The steam superheated in the condenser C may be introduced not into the middle stage of the steam turbine 2 but into a second steam turbine provided separately from the steam turbine 2, and the second steam turbine may be configured to recover power. Also in this case, the steam after recovery of power is returned to the condenser 4 where the steam is condensed.

According to the steam turbine power generating system of this embodiment, a heat pump cycle HP which comprises a heat source of a working oil discharged from the fluid coupling 10 and a cooling source of the low-pressure steam discharged from the steam turbine 2 is constructed to heat the low-pressure steam discharged from the steam turbine 2 by the working oil as a heat source, thereby recovering heat of a slip loss of the fluid coupling 10. Therefore, thermal efficiency of the entire steam turbine power generating system can be enhanced to improve power generation efficiency. In some cases, a power loss of the fluid coupling reaches 14.8% of rated power of the boiler feed pump BP at the maximum. However, according to the present invention, most of the power loss can be recovered by utilizing the heat pump cycle HP, and thus power generation efficiency of the entire steam turbine power generating system can be remarkably enhanced.

In the steam turbine power generating system shown in FIGS. 1 through 6, the steam turbine power generating system provided in the thermal power plant has been explained. In the case of a nuclear power plant, although a boiler will be replaced with a steam generator, the structure to recover heat from the working oil of the fluid coupling is the same as that of the thermal power plant.

Figure 7:
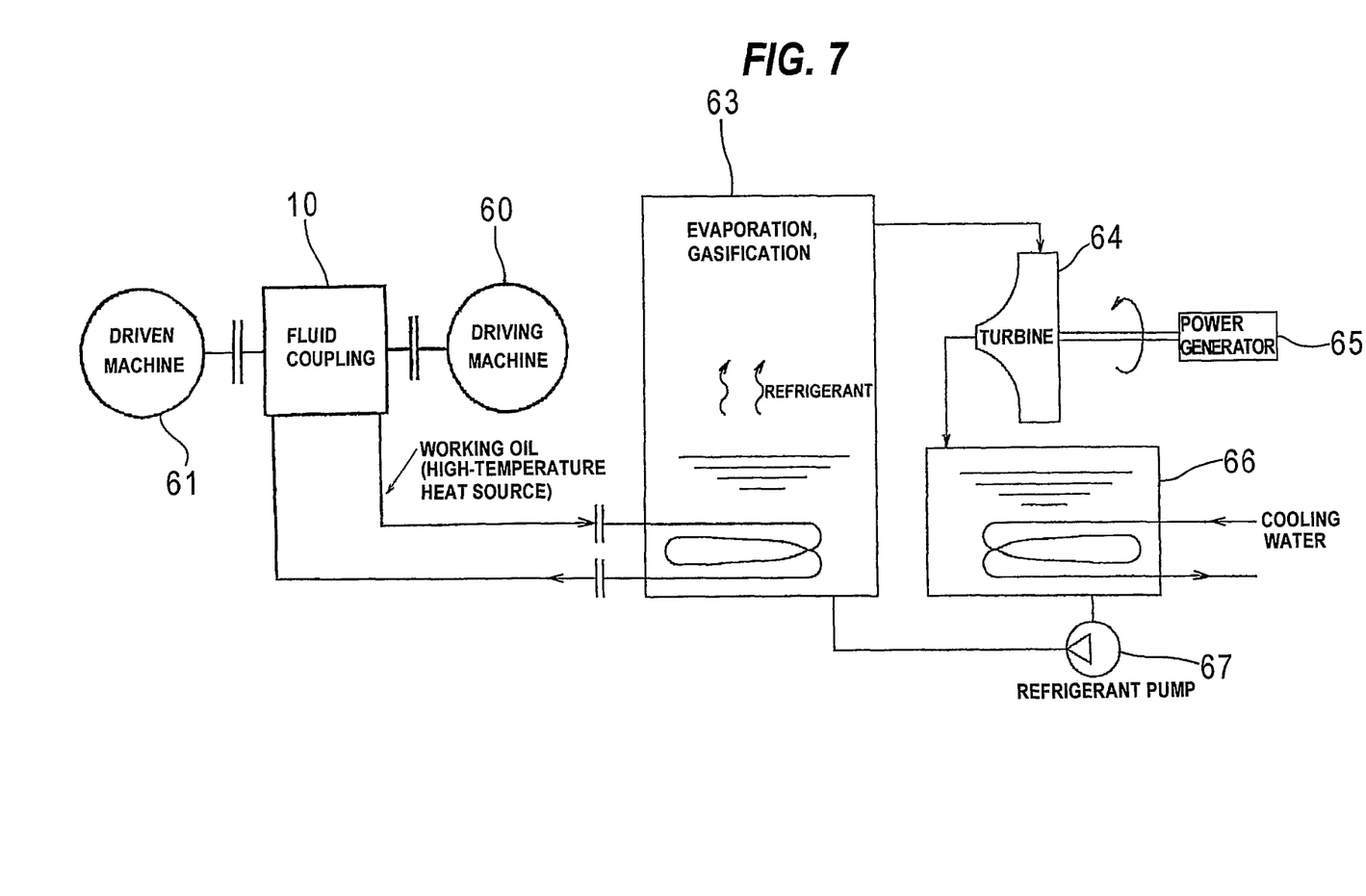
FIG. 7 is a schematic view showing still another example of the power generating system according to the present invention.

FIG. 7 is a schematic view showing still another embodiment of a power generating system according to the present invention. In the embodiment shown in FIG. 7, the power generating system is an exhaust heat power generating system which comprises a heat source of a working oil of a fluid coupling 10 and a cooling source of cooling water to generate power. In the exhaust heat power generating system, a refrigerant is evaporated by exhaust heat from the working oil of the fluid coupling, and a turbine is driven by using refrigerant vapor to generate power. As a refrigerant, a low-boiling refrigerant whose boiling point is around 40° C., for example, dichlorotrifluoroethane (HCFC123) or trifluoroethanol ($CF_3CH_2OH$) is used.

As shown in FIG. 7, a fluid coupling 10 is provided between a driving machine 60 and a driven machine 61. The driving machine 60 comprises a motor or an engine, and the driven machine 61 comprises an air blower or a pump. A fluid coupling 10 has the same structure as that shown in FIG. 2. A working oil discharged from the fluid coupling 10 is supplied to a vapor generator 63. A refrigerant in the vapor generator 63 is heated by heat exchange with the working oil. Therefore, part of the refrigerant evaporates to turn to high-temperature refrigerant vapor. Then, the refrigerant vapor is introduced into a turbine 64 and drives the turbine 64 to generate power by a power generator 65 coupled to the turbine 64. The refrigerant vapor discharged from the turbine 64 is introduced into a condenser 66 and cooled by cooling water, thus being condensed and liquefied. The liquefied refrigerant is resupplied to the vapor generator 63 by a refrigerant pump 67. The working oil discharged from the fluid coupling 10 has a temperature of about 70° C. to 90° C. at an inlet side of the vapor generator 63. The working oil is cooled down to a temperature of about 50° C. by removal of heat in the vapor generator 63, and then returns to the fluid coupling 10.

According to the exhaust heat power generating system shown in FIG. 7, heat of a slip loss of the fluid coupling 10 can be recovered by utilizing exhaust heat from the working oil of the fluid coupling 10 to evaporate the refrigerant and by using refrigerant vapor to drive the turbine 64, thereby generating power. Therefore, thermal efficiency of the entire system for pumping a fluid such as a liquid or a gas by driving the driven machine 61 using the fluid coupling 10 can be enhanced to achieve energy saving. In some cases, a power loss of the fluid coupling reaches 14.8% of rated power of the driven machine 61 at the maximum. However, according to this embodiment, most of the power loss can be recovered as power in the exhaust heat power generating system, and hence thermal efficiency of the entire system can be remarkably enhanced.

In the embodiment shown in FIG. 7, the air blower or the pump is used as the driven machine 61, however, a rotary machine such as a blower or a compressor may be used as the driven machine 61. According to this embodiment, thermal efficiency of the entire system having these rotary machines can be improved.

Although preferred embodiments of the present invention have been shown and described in detail, it should be understood that various changes and modifications may be made therein without departing from the scope of the appended claims.

For example, in the above embodiments, the temperature of the working oil whose heat is recovered is about 70° C. to 90° C. However, the temperature of the working oil can be lower or higher than the temperature of about 70° C. to 90° C. by controlling the circulating flow rate of the working oil. The temperature of the working oil may be raised to 100° C. or higher. The higher the temperature of the working oil is, the higher the efficiencies of heat exchange for the condensed water, the heat exchange medium and the refrigerant are.

The present invention can be applied to a power generating system which can recover exhaust heat from a working fluid of a fluid coupling and utilize the recovered exhaust heat to generate power.

REFERENCE SIGNS LIST 1 boiler
2 steam turbine 3 power generator
4 condenser
5 feed-water heater
10 fluid coupling
11 impeller
12 runner
13 scoop tube chamber
14 scoop tube
20, 50 heat exchanger
21 working oil path
30 first heat exchanger
31, 51 heat exchange medium path
32, 52 circulating pump
40 second heat exchanger
60 driving machine
61 driven machine
63 vapor generator
64 turbine
65 power generator
66 condenser
67 refrigerant pump
C condenser
Comp compressor
E evaporator
V expansion valve (pressure reducing valve)
M motor
BP boiler feed pump
CP condensate pump
HP heat pump cycle

The invention claimed is:

1. A power generating system in which water is supplied to a steam generator by a feed pump to generate steam, a steam turbine is driven by using the generated steam to generate power, the steam discharged from the steam turbine is condensed in a condenser to form condensed water, and then the condensed water is resupplied to the steam generator by the feed pump, the power generating system comprising:
 a fluid coupling provided between said feed pump and a driving machine for driving said feed pump to transmit a torque from said driving machine to said feed pump by a working oil which fills an impeller chamber of said fluid coupling;
 wherein the condensed water supplied from said condenser is heated by the working oil which is discharged from said fluid coupling; and
 wherein the condensed water heated by the working oil is supplied to said feed pump.

2. The power generating system according to claim 1, further comprising:
 a heat exchanger for performing a heat exchange between the working oil discharged from said fluid coupling and the condensed water supplied from said condenser to heat the condensed water.

3. The power generating system according to claim 1, further comprising:
 a first heat exchanger for performing a heat exchange between the working oil discharged from said fluid coupling and a heat exchange medium; and
 a second heat exchanger for performing a heat exchange between the heat exchange medium and the condensed water supplied from said condenser;
 wherein the heat exchange medium is heated by the heat exchange between the working oil and the heat exchange medium in said first heat exchanger, and the condensed water is heated by the heat exchange between the heat exchange medium heated in said first heat exchanger and the condensed water in said second heat exchanger.

4. The power generating system according to claim 1, further comprising a heat pump cycle which comprises an evaporator, a compressor, a refrigerant condenser and an expansion valve;
 wherein the working oil discharged from said fluid coupling is supplied to said evaporator to heat a refrigerant of said heat pump cycle, and the condensed water is supplied from said condenser to said refrigerant condenser to heat the condensed water.

5. The power generating system according to claim 1, further comprising a heat pump cycle which comprises an evaporator, a compressor, a refrigerant condenser and an expansion valve; and
 a heat exchanger for performing a heat exchange between the condensed water supplied from said condenser and a heat exchange medium;
 wherein the working oil discharged from said fluid coupling is supplied to said evaporator to heat a refrigerant of said heat pump cycle, and the heat exchange medium is supplied to said refrigerant condenser to heat the heat exchange medium; and
 the condensed water is heated in said heat exchanger by the heat exchange between the heat exchange medium heated in said refrigerant condenser and the condensed water supplied from said condenser.

6. A power generating system in which water is supplied to a steam generator by a feed pump to generate steam, a steam turbine is driven by using the generated steam to generate power, a first part of the steam discharged from the steam turbine is condensed in a condenser to form condensed water, and then the condensed water is resupplied to the steam generator by the feed pump, the power generating system comprising:
 a fluid coupling provided between said feed pump and a driving machine for driving said feed pump to transmit a torque from said driving machine to said feed pump by a working fluid which fills an impeller chamber; and
 a heat pump cycle which comprises an evaporator, a compressor, a refrigerant condenser and an expansion valve;
 wherein the working fluid is discharged from said fluid coupling and is supplied to said evaporator to heat a refrigerant of said heat pump cycle, a second part of the steam discharged from said steam turbine is supplied to said refrigerant condenser, and the second part of the steam discharged from said steam turbine is heated by the refrigerant which has been heated by the working fluid discharged from said fluid coupling.

7. The power generating system according to claim 6, wherein the second part of the steam which has been discharged from said steam turbine and heated in said refrigerant condenser is introduced into a middle stage of said steam turbine.

* * * * *